Oct. 3, 1933.   L. D. KAY   1,928,897
TRUCK WHEEL
Filed March 9, 1929
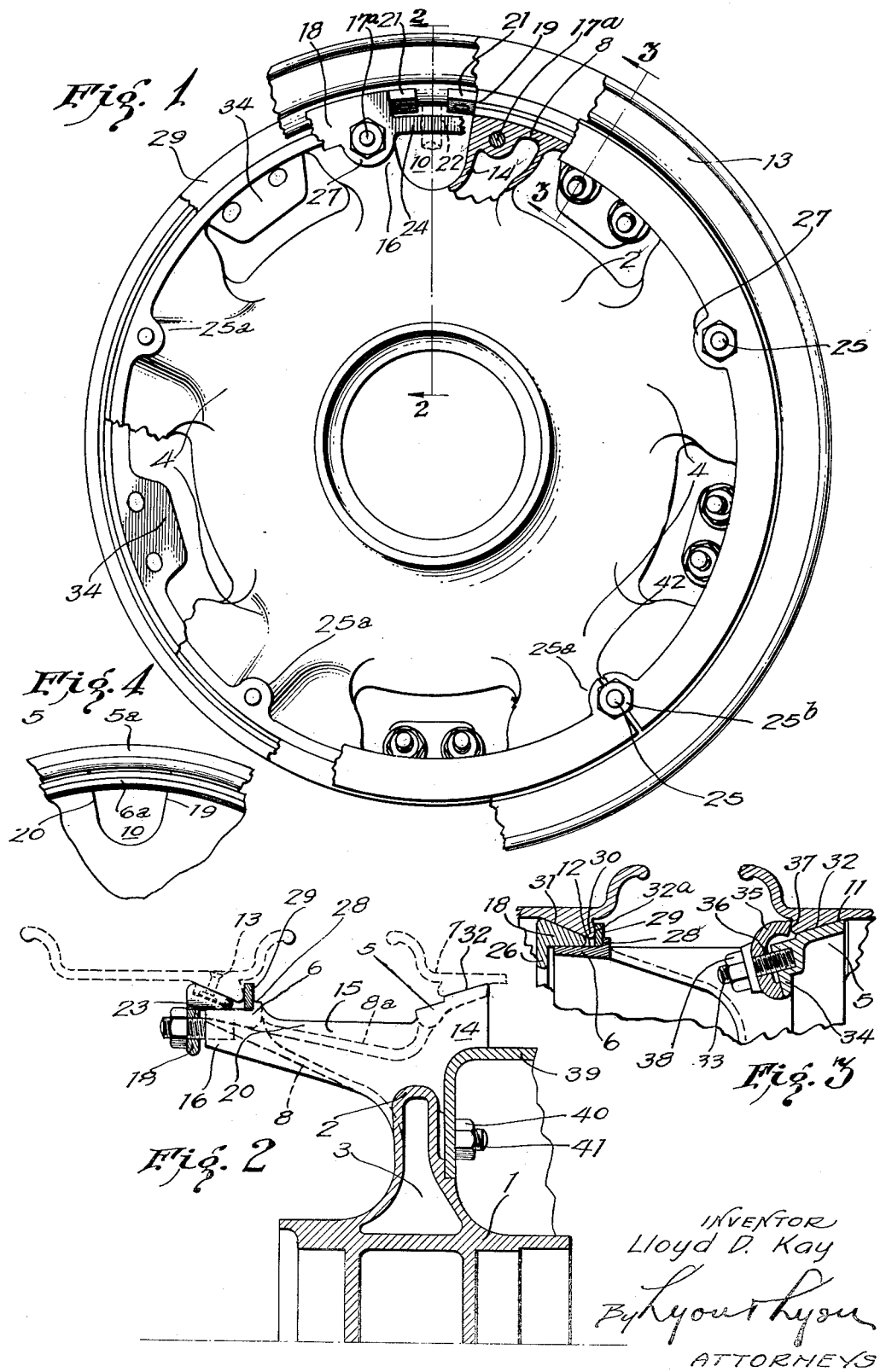
INVENTOR
Lloyd D. Kay
By Lyon & Lyon
ATTORNEYS Patented Oct. 3, 1933

1,928,897

UNITED STATES PATENT OFFICE 1,928,897

TRUCK WHEEL

Lloyd D. Kay, Los Angeles, Calif., assignor to Kay-Brunner Steel Products Inc., a corporation Application March 9, 1929. Serial No. 345,751

5 Claims. (Cl. 301—13)

This invention relates to wheels and particularly to automobile wheels. While the invention may be employed in the construction of automobile wheels of any type, it is particularly applicable in the construction of dual-tired truck wheels constructed as a casting, preferably cast steel, and of the dual-tired type.

In constructing wheels of the type referred to, the wheel is made with two felloes at its periphery providing seats for the inboard and outboard tire rims, and the tire rim is provided on its radially inner face with driving lugs which engage shoulders on the wheel for imparting the driving movement from the wheel to the tire rim. It has been my practice to provide a gap or slot in the periphery of the wheel at the point where the driving lugs are received by the wheel and this gap has been heretofore placed at or opposite an opening in the body of the wheel as, for example, in the space between two adjacent spokes.

By placing the gap at this point there is an unsupported overhanging portion of the felloes, and it is found in practice that when the tire rims are clamped up on their seats, there is a tendency for the metal adjacent the gap to "give" or spring in, causing the tire rims to become loose. However, the use of such a gap in the periphery of a wheel of this type has many advantages, as it greatly facilitates the placing of the inboard tire in position because the gap through the wheel permits the inboard rim to be readily slipped over the outboard seat.

The general object of this invention is to improve the general construction of a wheel of this type; also to produce a wheel having such a gap that will have such construction that the felloes adjacent the gap will be rigidly supported by the metal of the wheel, to the end that when the tire rims are clamped up, there will be no such springing of the metal as would tend to loosen the rims for the reasons suggested above.

A further object of the invention is to produce a cast metal wheel in which the outboard felloe can be supported at a considerable distance displaced in an outboard direction from the inboard felloe, at the same time providing a construction for the wheel that will effectively resist the strains to which the outboard felloe is subjected in clamping up the rim, and on the road; resulting in a cast wheel which is of relatively light weight but enabling the tires to be held spaced apart.

One of the objects of my invention also is to construct the wheel body so that ventilating openings are provided through the periphery to provide for ample circulation of air between the tires.

This is desirable to prevent overheating of the tires.

A further object of the invention is to provide a simple method for constructing a "gapped" wheel of this type so that the presence of the gap will not interfere with the machining of the felloes.

Further objects of the invention will appear hereinafter.

The invention consists in the novel parts and combination of parts to be described hereinafter, all of which contribute to produce an efficient truck wheel. The invention also resides in my novel method of constructing the wheel.

A preferred embodiment of the invention is described in the following specification, while the broad scope of the invention is pointed out in the appended claims.

In the drawing:

Figure 1 is a side elevation of a wheel embodying my invention showing a portion of the tire rim broken away together with portions of the wheel and showing parts of the wheel in cross section.

Figure 2 is a vertical section through the wheel taken about on the line 2—2 of Figure 1, but passing on the axis of an adjacent stud.

Figure 3 is a section taken through the wheel about on the line 3—3 of Figure 1.

Figure 4 is a fragmentary view showing a portion of the wheel at its periphery and at the location of the gap in the periphery showing the construction of the wheel as cast.

Before proceeding to a detail description of the invention, it should be stated that in its general construction, the wheel includes a body portion which may be cast integral with or rigidly secured to a hub. The periphery of the wheel includes an inboard felloe having a seat for the inboard tire rim and includes also an outboard felloe carrying a seat for the outboard tire rim. The outboard felloe is displaced a considerable distance in the outboard direction from the inboard felloe and is supported on integral posts extending out in an outboard direction from the wheel body. The periphery of the wheel is formed with a gap which passes through both felloes, and at this gap the driving lugs of the tire rims are located. By reason of the fact that this gap passes through the outboard felloe, it is evident that the inboard tire rim can be passed into position on its seat by passing it over the outboard portion of the wheel with its driving lugs located at the gap.

This gap placed at one of the spokes and with the spoke forked at the gap, is illustrated in my Patent No. 1,873,600 of Aug. 23, 1932, for Truck wheel.

The wheel is so constructed that in spite of this gap in the felloes, the tightening up of the clamping lugs and clamping ring for tightening the tire rims on their seats, will not spring the felloes inwardly at the gap. While the wheel, if desired, may be constructed with a disc form body, I prefer to construct it with spokes leaving large openings between the spokes, thereby considerably lightening the weight of the wheel. When employing this spoke type of construction, the gap in the periphery of the wheel is preferably located in line with one of the spokes, so that the spoke at which the gap is located is bifurcated. In this way, the forks formed by this bifurcation connect integrally with the adjacent portions of the felloes and produce rigid seats on the felloes for the tire rims.

Although when the wheel is completed, a gap is formed through its periphery passing through both the inboard and outboard felloes, in order to facilitate machining the rim seats on the felloes, the wheel is cast with the felloes extending across the gap. This avoids the cutting tool striking a shoulder as it passes the gap and facilitates machining the periphery of the wheel on a boring mill or other machine tool. After the periphery of the wheel has been machined, the portions of the felloes located at the gap are cut out.

Referring to the embodiment of the invention illustrated in the drawing, 1 represents the hub of the wheel which, if desired, may be cast integral with the body portion 2 of the wheel.

This body portion 2 is cored out in common with the hub as indicated at 3 so as to lighten the wheel without detracting from its strength, and the body portion of the wheel is preferably formed into a plurality of hollow spokes 4 which extend radially outwardly and carry an integral inboard felloe 5 and an integral outboard felloe 6. These felloes may be of any suitable construction but should be constructed so that the inboard tire rim 7 can readily be passed over the outboard portion of the wheel. The periphery 8 of the wheel between the spoke openings is a shallow dished arch 8a, with the concave side of the "dish" disposed radially outwardly (see Figure 2). When the wheel is cast, a deep substantially U-shaped gap 10 is formed at the periphery of the wheel (see Figure 4), but when the wheel is cast this gap is not completely open, but is closed by the portions 5a and 6a of the felloes 5 and 6 which extend across the gap. After the wheel has been machined, the portions 5a and 6a of these felloes located within the profile of the gap, as shown in Figure 4, are cut out by an acetylene torch or by using an electric arc applied to the wheel at the gap. It should be understood, however, that these portions 5a and 6a of the felloes should not be cut out until the finished faces 11 and 12 of the felloes 5 and 6 have been machined to form seats for the inboard tire rim 7 and the outboard tire rim 13.

At this gap 10 the metal of the wheel is preferably formed with a U-shaped web or wall 14 (see Figure 1) and, this web is extended toward the outboard side of the wheel in webs 15 that are integral with two posts 16, that carry studs 17a for attaching a wedge ring 18 for the outboard tire rim 13.

In other words, I construct the wheel at this point so that the sides of the gap are formed by flat substantially radial faces 19 and 20 against which the edges of the driving lugs 21 on the tire rims abut when the tire rims are in place. In Figure 2 the dotted section lines indicate the cross section of the felloes at the point where they connect with the wall of the gap.

The inflating nipples 22 for the tires are located between the driving lugs 21 and are offset so that the inflating nipple for the inboard tire extends in an outboard and inclined direction through the gap, and so that the inflating nipple of the outboard tire rim 13 extends in an inboard direction, passing across the radially outer edge 23 of the wedge ring 18 (see Figures 1 and 2), the wedge ring 18 being cut down to a narrow bar 24, where it crosses the gap (see Figure 1). In other words, the gap passes the inflating nipple and driving lugs for the inboard tire rim when passed onto the wheel from the outboard side.

As illustrated, there are two clamping studs 17a, one on each side of the gap. The other clamping studs 25 for clamping the wedge ring 18 at the other points are located around the wheel, preferably on the center lines of the spokes.

The body of the wedge ring 18 is of wedge cross section (see Figure 3) and formed at its outboard side with a relatively thin radially inwardly projecting flange 26. At the location of the clamping studs 17a and the clamping studs 25, the usual openings are provided in the wedge ring to receive the studs, and the flange 26 is formed with radially inwardly projecting ears 27 at these points to receive the bolts.

The seat face 12 of the outboard felloe 6 is preferably of cylindrical form, and at its inboard edge the felloe is provided with a radially outwardly projecting shoulder 28 against which a stop ring 29 seats. The tire rim is formed with a radially inwardly projecting clamping rib 30, with an inclined or conical inner face 31 that is engaged by the conical radially outer face of the wedge ring, the abrupt face or shoulder 32 of the rim seating against the stop-ring 29 (see Figure 3). This enables the outboard tire rim 13 to be effectively secured in position. If it is desired to change the amount of lateral displacement of the outboard tire rim 13, this is accomplished by using a stop-ring 29 of a different thickness.

The inboard tire rim 7 is of the same form in cross section as the outboard tire rim 13 but is mounted in a reverse position, so that the conical seat face 32a of its clamping rib comes upon the conical seat 11 which forms the radially outer face of the inboard felloe 5. The inboard tire rim 7 is held on its seat by means of studs 33 which are preferably disposed in pairs and secured on integral pads, that is to say, inclined seats 34. The clamping lugs 35 are elongated circumferentially of the wheel and provided with two openings 36 that receive the studs 33. Their radially inner ends seat against the pads 34 and their radially outer ends clamp up against the abrupt shoulder 37 of the clamping rib of the inboard tire rim. The usual clamping nuts 38 are provided on the studs 33 for clamping up the lugs 35. The clamping studs 33 are disposed with their axes inclined toward the axis at the outboard side of the wheel, so as to render them readily accessible. This accessibility is enhanced by having these studs located in the open spaces between the spokes.

The hub 1 may be provided with a brake drum 39 secured in place by nuts 40 attached to studs 41, disposed in the usual manner on the inboard side of the wheel.

Referring again to the clamping ring 18, this ring is formed with a split 42 which is preferably located in line with one of the clamping studs 25 which is located nearly diametrically opposite the location of the gap 10 on the wheel. This enables the wedge ring 18 to have the advantages of a split ring to facilitate putting it in place, but after it is in place, it is locked under the nut 25b at the split 42, so that it operates virtually as a continuous ring.

The use of elongated clamping lugs such as the lugs 35, is advantageous because they engage over two clamping studs 33 thereby enabling the studs to hold the lugs in proper alignment and the two bolts, of course, give additional security for the lugs, as well as insuring their proper alignment. In this connection, it should be understood that when a lug is used on a single stud, the stud does not prevent the lug from twisting on the axis of the stud.

On the outboard side of the body portion at each of the regular spokes that carry the studs 25 the outboard wall of the spoke is extended in an outboard direction to form a tapered post 25a terminating in a flat seat to receive its stud 25.

It is understood that the embodiment of the invention described herein is only one of the many embodiments this invention may take, and I do not wish to be limited in this practice of the invention, nor in the claims, to the particular embodiment set forth.

What I claim is:

1. A dual-tired truck wheel for carrying two tire rims having a hub and a body portion disposed in the plane of the hub, and having an inboard felloe with a single inboard tire rim seat integrally connected with the body portion of the wheel, an outboard felloe distinct from the inboard felloe having a single outboard tire rim seat and displaced in an outboard direction from the hub, and posts projecting in an outboard direction from the said body portion integrally connecting the body portion with the outboard felloe, each of said felloes having a gap extending laterally through the same from the outboard side of the wheel to pass the inboard tire inflating nipple and driving lugs from the outboard side, the metal of said felloes being connected at said gaps integrally with the body portion of the wheel, preventing springing of the felloes at their gaps when the tire rims are tightened up.

2. A dual-tired truck wheel having a hub and a body portion disposed in the plane of the hub, an inboard felloe having a single inboard tire-rim seat integrally connected with the body portion of the wheel, an outboard felloe distinct from the inboard felloe having a single outboard tire-rim seat and displaced in an outboard direction from the hub, and posts projecting in an outboard direction from the said body portion, integrally connecting the body portion with the outboard felloe, said body portion having a plurality of hollow spokes and said felloes having aligning gaps therein in line with one of said spokes, the spoke at the gap having forks lying respectively on opposite sides of the gap, and connected integrally to the metal of the felloes at the said gaps.

3. A dual-tired truck wheel having a hub and a body portion disposed in the plane of the hub, a single inboard felloe having a single substantially conical inboard tire-rim seat, integrally connected with the body portion of the wheel; a single outboard felloe distinct from the inboard felloe having a single outboard tire-rim seat and displaced in an outboard direction from the hub, and posts located in the central radial plane of the spokes respectively, projecting in an outboard direction from the said body portion and integrally connecting the body portion of the wheel with the outboard felloe and studs located centrally respectively on the outer ends of said posts for attaching the outboard tire rim.

4. A vehicle wheel having a hub and a plurality of hollow spokes extending radially outwardly therefrom, said wheel having a felloe integral with the said spokes and having a gap extending completely through the felloe and in line with one of said spokes so that the spoke adjacent said gap is bifurcated, forming forks with a web forming the wall of the gap and connecting the forks integrally with the said felloe at the sides of said gap.

5. A vehicle wheel having a hub and a plurality of spokes extending outwardly therefrom, said wheel having a periphery integral with the said spokes and having a gap extending completely through the periphery in line with one of said spokes, said last named spoke being hollow and bifurcated with forks forming a gap, with a web forming a wall of the gap and connecting the forks integrally with the said periphery at the sides of said gap, said periphery having an inboard felloe with a single substantially conical seat face to carry the inboard tire rim and having an outboard felloe with a circumferential face distinct from the inboard felloe, said spokes having integral posts extending in an outboard direction from the body of the wheel and supporting the said outboard felloe.

LLOYD D. KAY.